United States Patent
Zhang et al.

(10) Patent No.: US 12,262,410 B2
(45) Date of Patent: Mar. 25, 2025

(54) LISTEN-BEFORE-TALK MODE INDICATION FOR WIRELESS COMMUNICATION

(71) Applicant: ZTE Corporation, Guangdong (CN)

(72) Inventors: Li Zhang, Shenzhen (CN); He Huang, Shenzhen (CN); Eswar Kalyan Vutukuri, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 369 days.

(21) Appl. No.: 17/743,034

(22) Filed: May 12, 2022

(65) Prior Publication Data

US 2022/0272749 A1  Aug. 25, 2022

Related U.S. Application Data

(63) Continuation of application No. PCT/CN2019/118723, filed on Nov. 15, 2019.

(51) Int. Cl.
*H04W 74/00* (2009.01)
*H04W 74/0808* (2024.01)
*H04W 74/0833* (2024.01)

(52) U.S. Cl.
CPC ....... *H04W 74/006* (2013.01); *H04W 74/002* (2013.01); *H04W 74/0808* (2013.01); *H04W 74/0833* (2013.01)

(58) Field of Classification Search
CPC ............. H04W 74/006; H04W 74/002; H04W 74/0808; H04W 74/0833; H04W 16/14; H04W 72/14; H04W 72/23; H04L 5/0053; H04L 5/001; H04L 5/0048
See application file for complete search history.

(56) References Cited

U.S. PATENT DOCUMENTS

| | | | |
|---|---|---|---|
| 2019/0174548 A1 | 6/2019 | Jiang et al. | |
| 2019/0373635 A1 | 12/2019 | Yang et al. | |
| 2020/0037361 A1* | 1/2020 | Chakraborty | H04W 72/23 |
| 2020/0053798 A1* | 2/2020 | Tsai | H04W 74/0833 |
| 2021/0127419 A1 | 4/2021 | Zhang | |

FOREIGN PATENT DOCUMENTS

| | | |
|---|---|---|
| CN | 110268795 A | 9/2019 |
| CN | 110351881 A | 10/2019 |
| EP | 3337231 A1 | 6/2018 |
| WO | WO 2017/181124 A1 | 10/2017 |
| WO | WO 2018/218039 A1 | 11/2018 |
| WO | WO 2020/164058 A1 | 8/2020 |

OTHER PUBLICATIONS

First Office Action for corresponding Chinese application No. 201980102116.7 dated Dec. 6, 2022, 8p, in Chinese language.
English language translation of the Notification of the First Office Action for corresponding Chinese application No. 201980102116.7 dated Dec. 6, 2022, 8p.

(Continued)

*Primary Examiner* — Rushil P. Sampat
(74) *Attorney, Agent, or Firm* — Crowell & Moring LLP

(57) ABSTRACT

This disclosure relates to wireless communication methods that utilize and enable the communication of an indication of a listen-before-talk (LBT) mode from a wireless access node to a mobile station.

18 Claims, 8 Drawing Sheets

(56) References Cited

OTHER PUBLICATIONS

International Search Report for priority application No. PCT/CN2019/118723 dated Jul. 31, 2020, 3p. in English.
Written Opinion for priority application No. PCT/CN2019/118723 dated Jul. 31, 2020, 5p, in English.
Second Office Action for corresponding Chinese application No. 201980102116.7 dated Feb. 25, 2023, 3p.
English language translation of the Notification of the Second Office Action for corresponding Chinese application No. 201980102116.7 dated Feb. 25, 2023, 2p.

\* cited by examiner

LISTEN-BEFORE-TALK MODE INDICATION FOR WIRELESS COMMUNICATION

This application is a continuation application of International Application No. PCT/CN2019/118723, filed Nov. 15, 2019, the entirety of which is hereby incorporated by reference.

TECHNICAL FIELD

This disclosure is directed generally to wireless communication networks and particularly to message transmissions between wireless communication network nodes.

BACKGROUND

Wireless communication technologies are moving the world towards a rapidly increasing network connectivity. High-speed and low-latency wireless communications rely on efficient network resource management and allocation between user mobile stations and wireless access network nodes (including but not limited to wireless base stations). Unlike traditional circuit-switched networks, efficient wireless access networks may not rely on dedicated user channels. Instead, wireless network resources (such as carrier frequencies and transmission time slots) for transmitting voice or other types of data between mobile stations and wireless access network nodes may be allocated on a contention-based random access basis.

SUMMARY

In one embodiment, a wireless communication method includes a wireless access node receiving from the mobile station a first message (e.g., a random access response (RAR) message). In response to receiving the first message, the wireless access node transmits to the mobile station a second message comprising an indication of a listen-before-talk (LBT) mode for the mobile station. In another embodiment, another wireless communication method includes a wireless access node transmitting to a mobile station a random access response (RAR) message comprising an indication of a listen-before-talk (LBT) mode for the mobile station.

In another embodiment, another wireless communication method includes a mobile station transmitting to a wireless access node, a first message (e.g., a RACH preamble message). After transmitting the first message, the mobile station receives from the wireless access node a second message (e.g., a RAR message) comprising an indication of an LBT mode for the mobile station. The mobile station then performs an LBT procedure dictated by the indication of the LBT mode in the second message prior to transmitting a third message (e.g., a msg3) to the wireless access node.

The above embodiments and other aspects and alternatives of their implementations are described in greater detail in the drawings, the descriptions, and the claims below.

DETAILED DESCRIPTION

A wireless access network provides network connectivity between mobile stations and an information or data network (such as a voice communication network or the Internet). An example wireless access network may be based on cellular technologies, which may further be based on, for example, 4G, Long Term Evolution (LTE), 5G, New Radio (NR), and/or New Radio Unlicensed (NR-U) technologies and/or formats.

Figure 1:
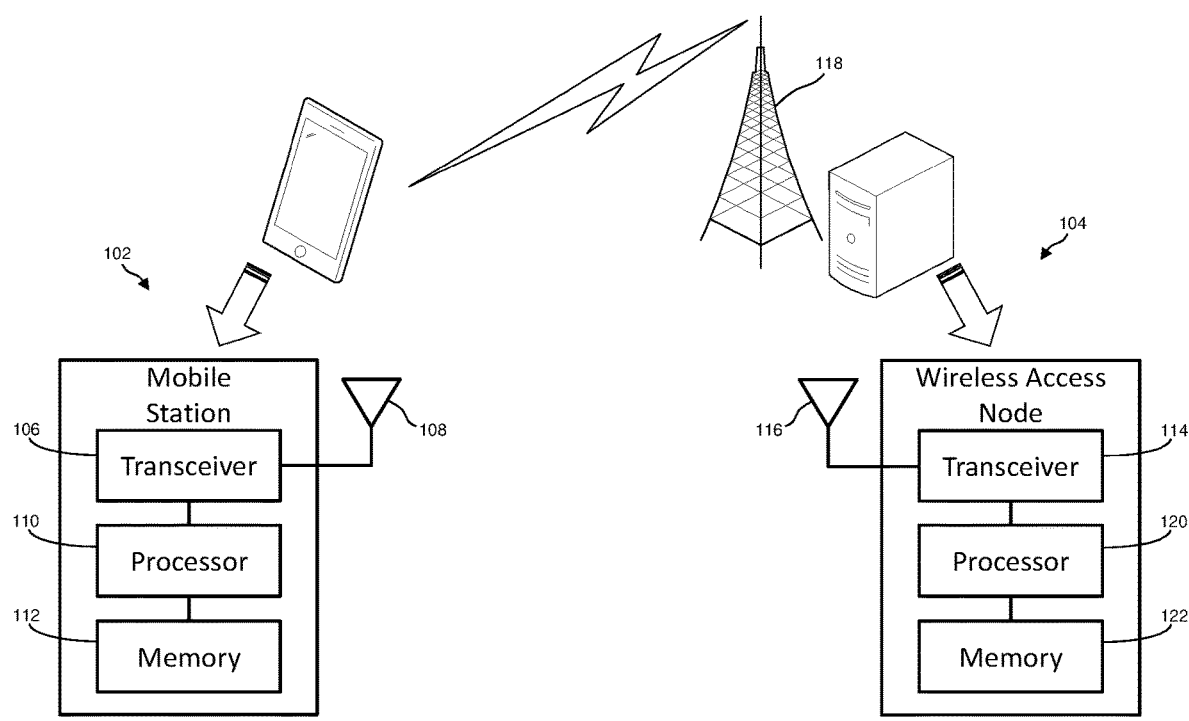
FIG. 1 shows an example system diagram including a mobile station and a wireless access node according to various embodiments.

FIG. 1 shows an example system diagram including a mobile station 102 and a wireless access node 104 according to various embodiments. The mobile station 102 may comprise a user equipment (UE), which may further include but is not limited to a mobile phone, smart phone, tablet, laptop computer, or other mobile devices that are capable of communicating wirelessly over a network. The mobile station 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, the wireless access node 104 may comprise a base station or other wireless network access points capable of communicating wirelessly over a network with one or many mobile stations. For example, the wireless access node 104 may comprise a 4G LTE base station, a 5G NR base station, a 5G central-unit base station, a 5G distributed-unit base station, or a next generation Node B (gNB), an enhanced Node B (eNB), or other base station, in various embodiments. The wireless access node 104 may include transceiver circuitry 114 coupled to an antenna 116, which may include an antenna tower 118 in various approaches, to effect wireless communication with the mobile station 102. The transceiver circuitry 114 may also be coupled to one or more processors 120, which may also be coupled to a memory 122 or other storage device. The memory 122 may store therein instructions or code that, when read and executed by the processor 120, cause the processor 120 to implement various ones of the methods described herein.

Figure 2:
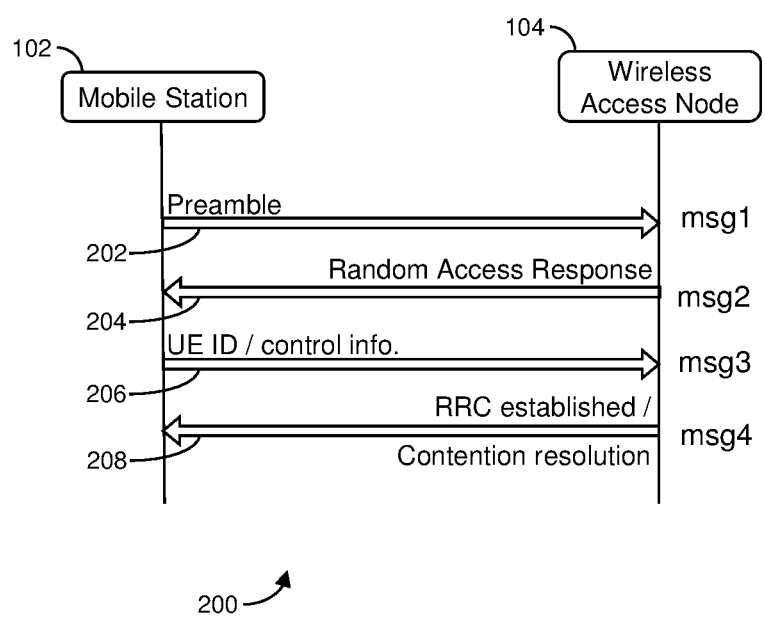
FIG. 2 shows an example of a transmission format procedure for transmissions between a mobile station and a wireless access node.

The wireless access network may provide or employ various transmission formats and protocols for wireless message transmission between the mobile station 102 and the wireless access node 104. FIG. 2 show an example of a transmission format procedure for transmissions between the mobile station 102 and the wireless access node 104 according to various embodiments. In certain approaches, the wireless access network may employ a random access procedure (e.g., RACH) and interface, wherein a mobile station 102 may request access to the network through a series of message transmissions to and from the wireless access node 104. FIG. 2 illustrates a transmission format within the example context for purposes of explanation. For example, FIG. 2 shows an example four-step RACH procedure. However, the transmission format described with respect to FIG. 2 is not limited to the RACH procedure example context and may be used for other message transmission types and protocols.

FIG. 2 shows an example four-step transmission format procedure 200 in accordance with various embodiments (which is referred to herein as a "second transmission format"). The mobile station 102 transmits a first message 202 (i.e., msg1) on a first physical channel to the wireless access node 104, which may include a preamble message in various approaches. Within the example RACH procedure context, the first message 202 may include a preamble of a RACH request, which may be transmitted on a first physical channel, for example, a physical random access channel (PRACH). After receiving the first message 202, the wireless access node 104 transmits a second message 204 (i.e., msg2) back to the mobile station 102, which may include a recognition message. In the example RACH procedure context, the second message 204 comprises a random access response (RAR) message.

After receiving the second message 204, the mobile station 102 may transmit a third message 206 (i.e., msg3), which may be transmitted on a second physical channel, to the wireless access node 104, which third message 206 may include a payload message in various approaches. Within the example context of a RACH procedure, the third message 206 may include a payload of a RACH request, including a UE identification and control information, which may be transmitted on a second physical channel, for example, a physical uplink shared channel (PUSCH). After receiving the third message 206, the wireless access node 104 may transmit a fourth message 208 (i.e., msg4) back to the mobile station 102, which may include additional information such as configuration information. In the example RACH procedure context, the fourth message 208 may include a radio resource control (RRC) information and/or contention resolution information (e.g., in an instance where more than one mobile station simultaneously requests RACH access).

The terms "channel" and "physical channel" are used herein to broadly refer to network transmission resources, including but not limited to any combination of transmission carrier frequencies and time units. In various examples, a "physical channel" may include instances or occasions of single time units or groups of multiple time units (which multiple time units may be consecutive time units) that are configured or assigned as a particular channel (for example, a PRACH occasion or a PUSCH occasion). Additionally, the term "cell" is used herein to broadly refer to different network cell types, including but not limited to primary cells (PCell) and secondary cells (SCell), in addition to other cell types.

In various embodiments, when a mobile station 102, or a cell of the mobile station 102, operates in an unlicensed spectrum, the mobile station 102 must implement a listen-before-talk (LBT) procedure to determine if the channel is occupied or clear. In certain examples, as part of the LBT procedure, the mobile station 102 performs a clear channel assessment (CCA) check before transmitting its message (e.g., a msg3). The mobile station 102 may implement the CCA check, for example, by utilizing energy detection to determine the presence or absence of other signals on the channel in order to determine if the channel is occupied or clear.

If the mobile station 102 determines that the channel is occupied, an LBT failure event occurs. The mobile station 102 may enter a backoff state, wherein the mobile station 102 starts a backoff timer and waits until the backoff timer expires before performing another LBT check. In certain approaches, the backoff timer is decremented whenever there is an unoccupied slot on the channel or medium.

If mobile station 102 determines the channel is clear, the mobile station 102 can transmit its message. The duration of transmission, also called a channel occupancy time (COT), is limited in duration and may be governed by the backoff parameters used to access the channel.

In an example RACH procedure context, the mobile station 102 may be blocked from transmitting a msg3 due to LBT failure as noted above. As such, the RACH procedure may fail.

In one embodiment, in order to reduce RACH failure caused by LBT failure, once the network (e.g., the wireless access node 104) gets the channel, the mobile station 102 may share the COT initialed by the wireless access node 104 in order to reduce the likelihood of LBT failure. In various approaches, for COT sharing, an LBT mode or type performed by the mobile station 102 is based on various factors, including the LBT mode or type performed by the wireless access node 104, a COT length acquired by the wireless access node 104, and the gap between DL and UL resources within the channel.

For instance, when the wireless access node 104 performs a CAT4 LBT mode procedure and acquires the channel for a sufficient duration of time, the wireless access node 104 can share some of the COT with any mobile station 102. For example, the wireless access node 104 can share some of the COT with any mobile station 102 that need to transmit a msg3.

In different approaches, the wireless access node 104 may implement the LBT procedures according to a plurality of different LBT modes. For example, when the gap between a downlink (DL) transmission and a scheduled uplink (UL) transmission, or the gap between two consecutive UL transmissions, in this shared COT is less than 16 us, the wireless access node 104 may determine that an LBT mode where no LBT will used (e.g., used by the mobile station 102). In another example, when the gap is equal to 16 us or 25 us, the wireless access node 104 may determine that an LBT mode of Cat 2 with 16 us or 25 us will be performed. In yet another example, if the gap is more than 25 us, the wireless access node 104 may determine that an LBT mode of Cat 4 will be performed. Other LBT modes are possible and the embodiments discussed herein are not limited to these example LBT modes. Thus, in accordance with various embodiments, the mobile station 102 and/or the wireless access node 104 may utilize multiple different possible LBT modes or types, which, in some approaches, may be based at least in part on the gap length. Because the wireless access node 104 knows the gap length, the wireless access node 104 may indicate the LBT mode or type to the mobile station 102 in various embodiments. In response, the UE may perform LBT according to the indication of the LBT mode before transmitting a message, such as a msg3 in a RACH procedure context.

In accordance with the above description, the wireless access node 104 can indicate the LBT mode to the mobile station 102 for the mobile station 102 to utilize (e.g., to transmit a msg3). The wireless access node 104 may indicate the LBT mode in the RAR message (i.e., the msg2) in the example RACH procedure context.

Figure 3:
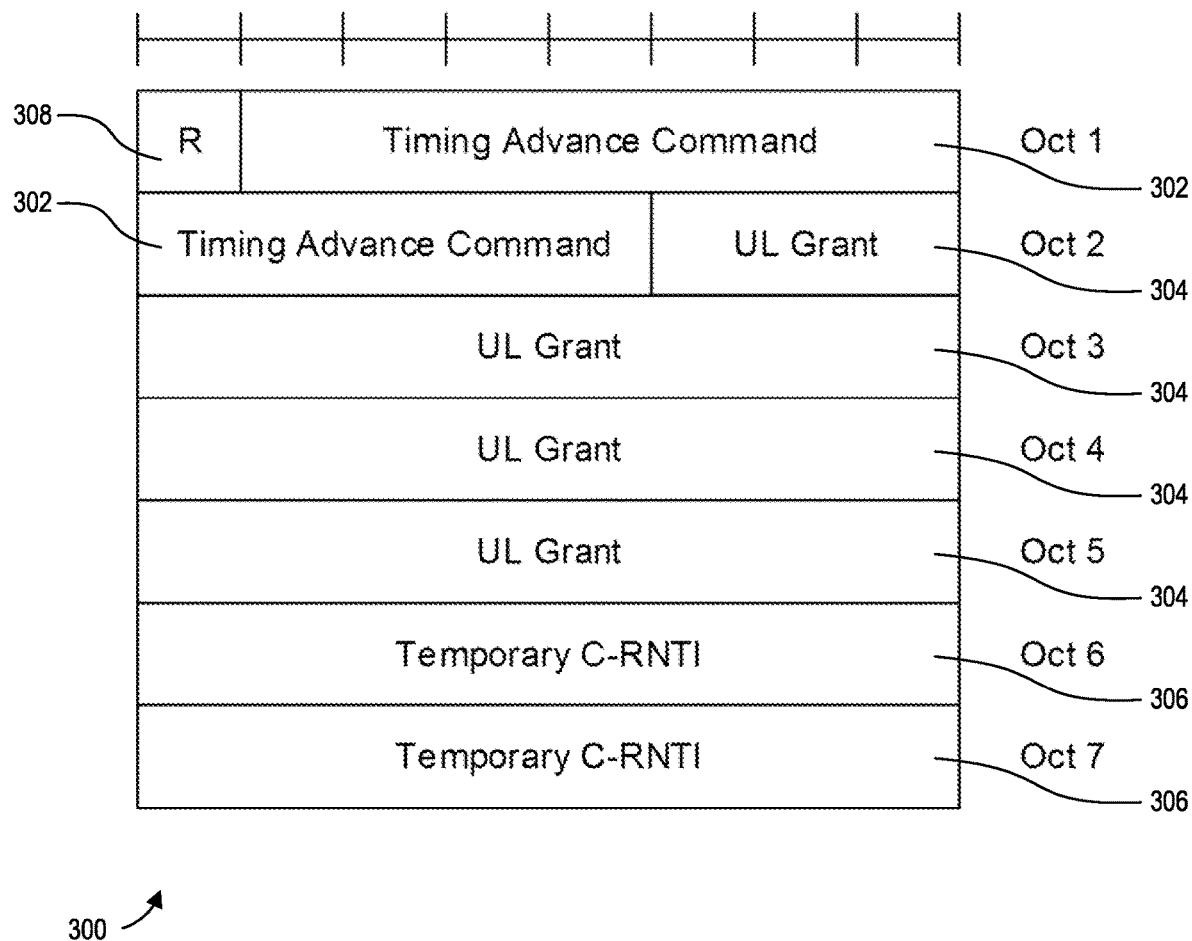
FIG. 3 shows an example of a known RAR message format.

FIG. 3 illustrates an example known RAR message format 300. For example, the RAR message format 300 may be according to Release-15 of the NR specification. In various embodiments, the RAR message format 300 includes seven bytes (i.e., 56 bits). The RAR message format 300 may reserve blocks of bits within the RAR message for specific purposes. For example, as is shown in FIG. 3, the RAR message format 300 includes a reserved block of bits for Timing Advance Command 302, a reserved block of bits for UL Grant 304, and a reserved block of bits for Temporary Cell Radio Network Temporary Identifier (C-RNTI) 306. The RAR message format 300 may also include, an additional reserved bit (R) 308, which can occupy the first bit in the RAR message, and which may be reserved for other purposes or may be reserved to remain blank or null.

However, if the wireless access node 104 is to include the indication of the LBT mode in the RAR message, the RAR message format 300 as depicted in FIG. 3 can be modified according to different approaches. In one approach, because no bits are reserved in the RAR message format 300 for the indication of the LBT mode, the RAR message format can be modified to include one or more bits. In one approach, two bits can be added (e.g., to indicate four different LBT modes).

However, if the RAR message format is modified, for example, the change its length, then backward compatibility can become a problem. Backward compatibility issues occur when a mobile station configured according to previous generations (e.g., Release-15 NR UEs that do not understand the new NR-U RAR message format) receive a RAR message that is formatted according to the new RAR message format and that is addressed to a new generation mobile station. For example, one specific issue is that the RAR message format 300 of FIG. 3 does not include a length indicator in its header, and hence the legacy mobile stations assume a fixed size RAR message. If the RAR message format size changes, then the legacy mobile stations will not be able to parse the RAR message.

When the network operates in a standalone (SA) configuration, all serving cells are unlicensed. Thus, a new RAR message format with a different size of RAR message can be applied for all the mobile stations in that network. Thus, no backward compatibility issue exists in SA cells that are deployed in unlicensed frequencies.

However, issues can occur with networks that operates in a carrier aggregation (CA) configuration, which includes a mix of cells operating in both the licensed and unlicensed spectrum. An example CA configuration may include a PCell operating in the licensed spectrum and an SCell operating in the unlicensed spectrum. In such an example, for a timing advance for the SCell, mobile station 102 may send a RACH preamble message (msg1) in the SCell, and the wireless access node 104 may respond by sending the timing advance command for the SCell with a RAR message sent in PCell. After which, the mobile station 102 may transmit the msg3 in SCell according to the timing advance received in the RAR message. In this example, the RAR message for a cell operating in the licensed spectrum (e.g., the PCell) and a RAR message for a cell operating in the unlicensed spectrum (e.g., the SCell) can be multiplexed into one medium access control protocol data unit (MAC PDU) on the cell operating in the licensed spectrum (e.g., the PCell). However, once the mobile station receives the MAC RAR of the two different formats multiplexed together, a parsing error can occur, especially if the RAR message format of the unlicensed cell is of a different size than the RAR message format of the licensed cell. Many of the embodiment discussed herein provide solutions to this particular problem.

In a first approach, the RAR message format size for an unlicensed cell is kept the same size as a licensed cell, and at least one bit within the RAR message is repurposed to provide the indication of the LBT mode. Various specific examples of this first approach are discussed below.

In a second approach, a RAR messages for the different cell types (i.e., unlicensed and licensed) are handled separately so that they are not multiplexed together. Various specific examples of this second approach are discussed below.

In accordance with these approaches, a method of communicating between a wireless access node 104 and a mobile station 102 includes the wireless access node 104 receiving from the mobile station 102 a first message. In response to receiving the first message, the wireless access node 104 transmits to the mobile station a second message comprising an indication of a LBT mode for the mobile station 102. In the example RACH process context, the first message may be a preamble message (msg1) and the second message may be the RAR message (msg2).

In a similar manner, a method of communicating that is performed by the mobile station 102 includes transmitting the first message (e.g., a preamble/msg1) to the wireless access node 104. After transmitting the first message, the mobile station 102 receives from the wireless access node 104 the second message (e.g., the RAR message or msg2) comprising the indication of the LBT mode for the mobile station 102. In response, the mobile station 102 performs an LBT procedure dictated by the indication of the LBT mode in the second message prior to transmitting a third message (e.g., a msg3) to the wireless access node 104.

Additionally, the above methods may include the wireless access node 104 determining the LBT mode for the mobile station 102 prior to transmitting the second message (e.g., the RAR message). As discussed above, the wireless access node 104 may determine which LBT mode to indicate based on a variety of factors including, for example, the LBT mode or type performed by the wireless access node 104, a COT length acquired by the wireless access node 104, and the gap between DL and UL resources within the channel. The wireless access node 104 may select LBT mode from a plurality of LBT modes, which may be, in one example, a set of four LBT modes (wherein two bits are utilized to indicate which of these four LBT modes are selected). In a specific example, the wireless access node 104 selects the LBT mode from a set comprising CAT4 LBT, 16 us CAT2 LBT, 25 us CAT2 LBT, and no LBT. Other example LBT modes are contemplated, as are other numbers of LBT modes to select from (which may dictate a number of required bits in the RAR message format).

Additionally, the above methods may involve the mobile station operating in a carrier aggregation (CA) arrangement or configuration. As such, the mobile station 102 may utilize at least two cells, wherein a first cell of the mobile station 102 operates in a licensed spectrum and a second cell of the mobile station 102 operates in an unlicensed spectrum. Similarly, the second message (e.g., RAR message) may apply to a cell operating in the unlicensed spectrum. Additionally, the above methods may be utilized when the mobile station is in a connected mode with the wireless access node.

Regarding the first approach mentioned above, more specific embodiments include keeping the first message (e.g., RAR message) format size the same as between licensed and unlicensed cells and repurposing at least one bit of the first message (e.g., the RAR message) to provide the indication of the LBT mode to be used. In one example, if four different LBT modes or types are supported, two bits can be repurposed in the first message (e.g., the RAR message) format to provide the indication of the LBT mode.

In the example RACH procedure context, wherein the second message is the RAR message, the method may include the wireless access node 104 transmitting to the mobile station 102, as part of the second message, at least one bit representing, at least in part, the LBT mode on at least one transmission bit location within the second message (e.g., the RAR message) that is reserved for the C-RNTI. In various approaches, the at least one bit may be two bits or more than two bits, and the at least one transmission bit location may be two or more than two transmission bit locations.

Figure 4:
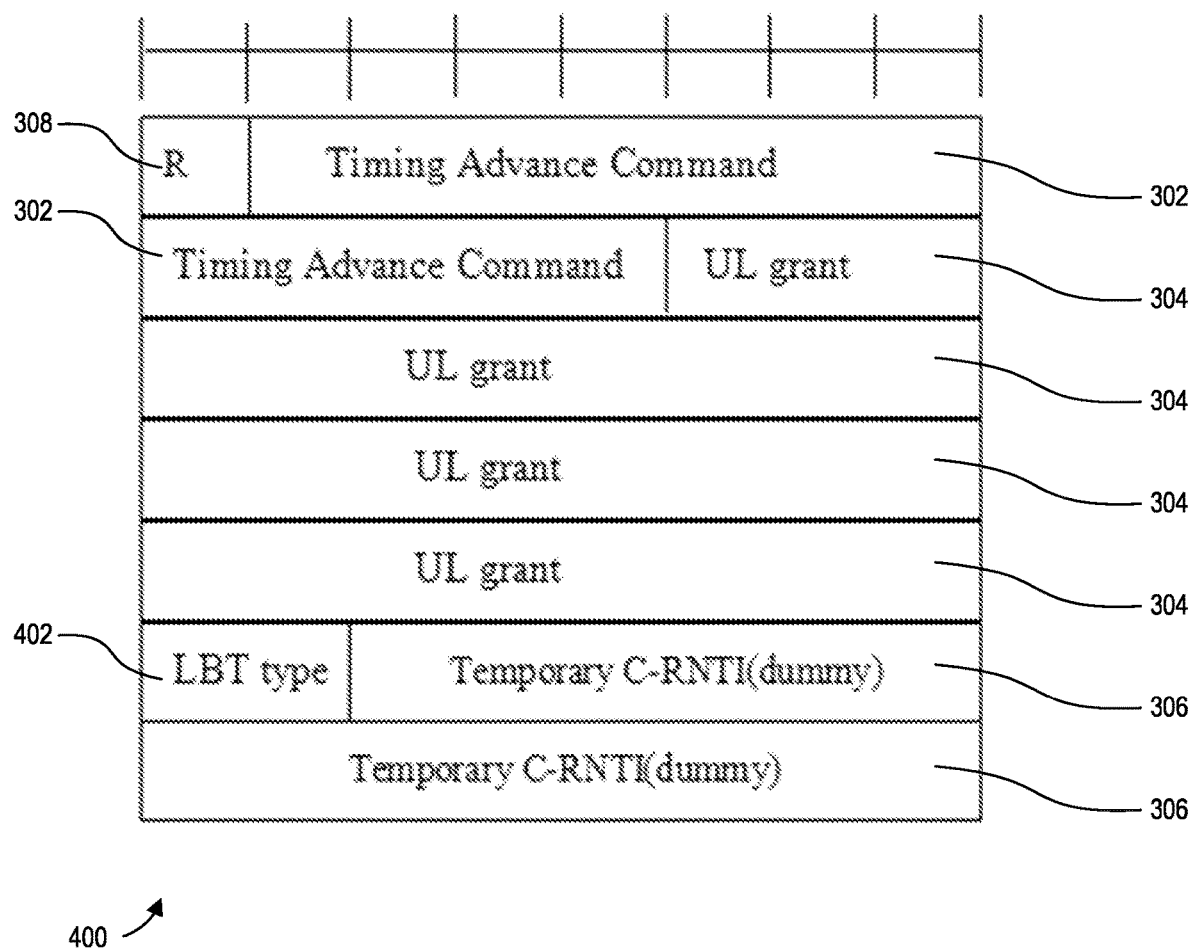
FIG. 4 shows an example RAR message format in accordance with various embodiments.

FIG. 4 shows an example RAR message format 400 according to the present embodiment. The example RAR message format 400 includes the reserved block of bits for the Timing Advance Command 302, the reserved block of bits for the UL Grant 304, and the additional reserved bit (R) 308, each of which are illustrated as unchanged in comparison to the RAR message format 300 of FIG. 3. However, in this example RAR message format 400, two transmission bit locations within the reserved block of bits for C-RNTI 306 are repurposed to provide the indication of the LBT mode or type 402. In various examples (as is shown in FIG. 4), the indication of the LBT mode or type 402 is placed at the transmission bit location(s) within the RAR message format 400 at the beginning of the reserved block of bits for the C-RNTI 306. However, in other examples, the indication of the LBT mode or type 402 can be placed at transmission bit location(s) within the RAR message format 400 at the end of the reserved block of bits for the C-RNTI 306, or at any other location with the reserved block of bits for the C-RNTI 306. Additionally, in the case of multiple bits (e.g., 2 or more) being used for the indication of the LBT mode or type 402, those bits can be consecutive transmission bit location, or may be split up to occupy different, non-consecutive or non-adjacent transmission bit locations within the reserved block of bits for the C-RNTI 306. Variations are possible.

Because the size of the RAR message is the same as between an unlicensed cell and a licensed cell, there is no problem when the RAR message for a licensed cell and the RAR message for an unlicensed cell are multiplexed. Accordingly, LBT mode selection can be achieved in a CA configuration where different cells operate in licensed and unlicensed spectrums.

In another embodiment, the Temporary C-RNTI 306 may not be needed (e.g., if the mobile station 102 is in a connected mode with the wireless access node 104). As such, in accordance with this embodiment, the C-RNTI can be removed in such situations. For example, a remainder of the block of bits within the RAR message that are reserved for the C-RNTI 306 (see FIG. 3) can be altered or repurposed to be reserved for a different message purpose and/or to be blank or null.

Figure 5:
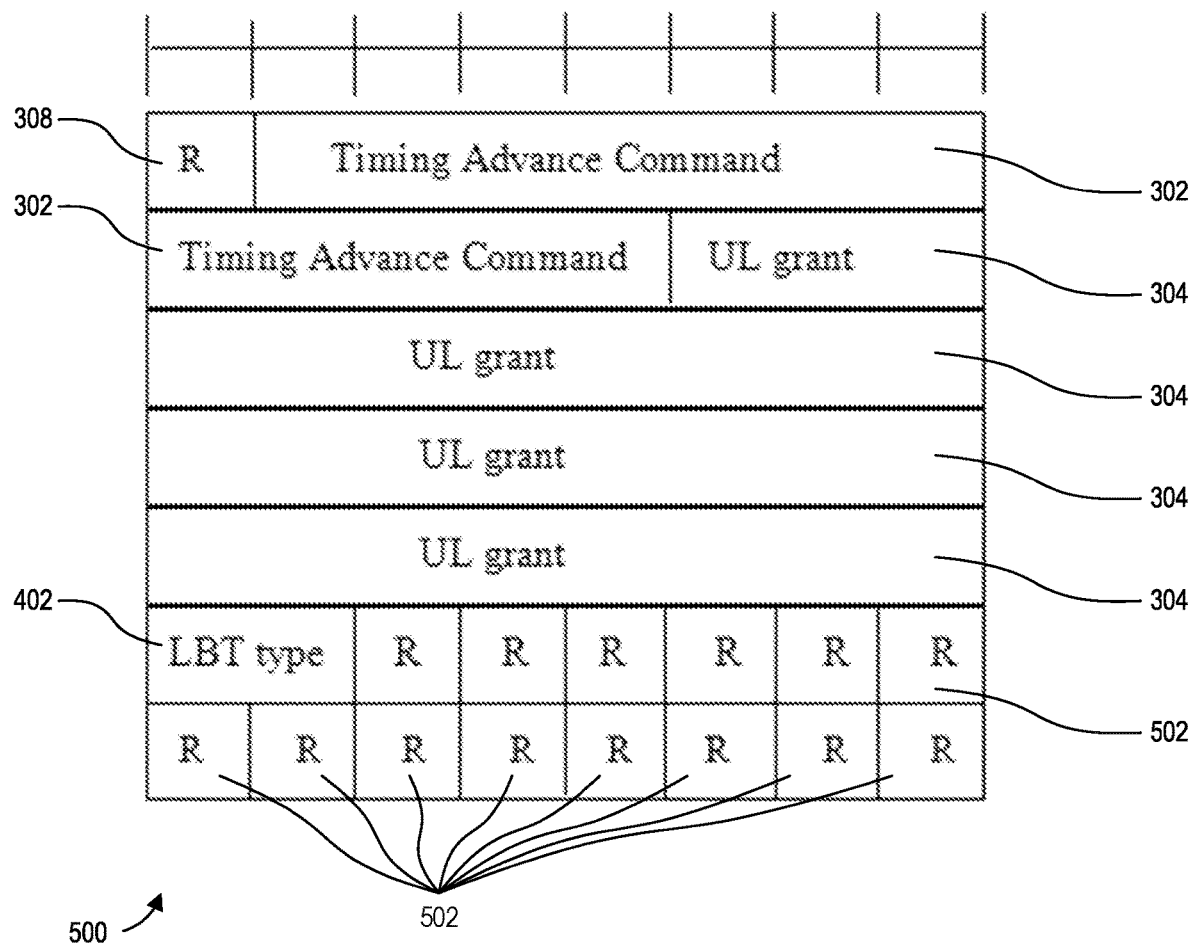
FIG. 5 shows another example RAR message format in accordance with various embodiments.
Figure 6:
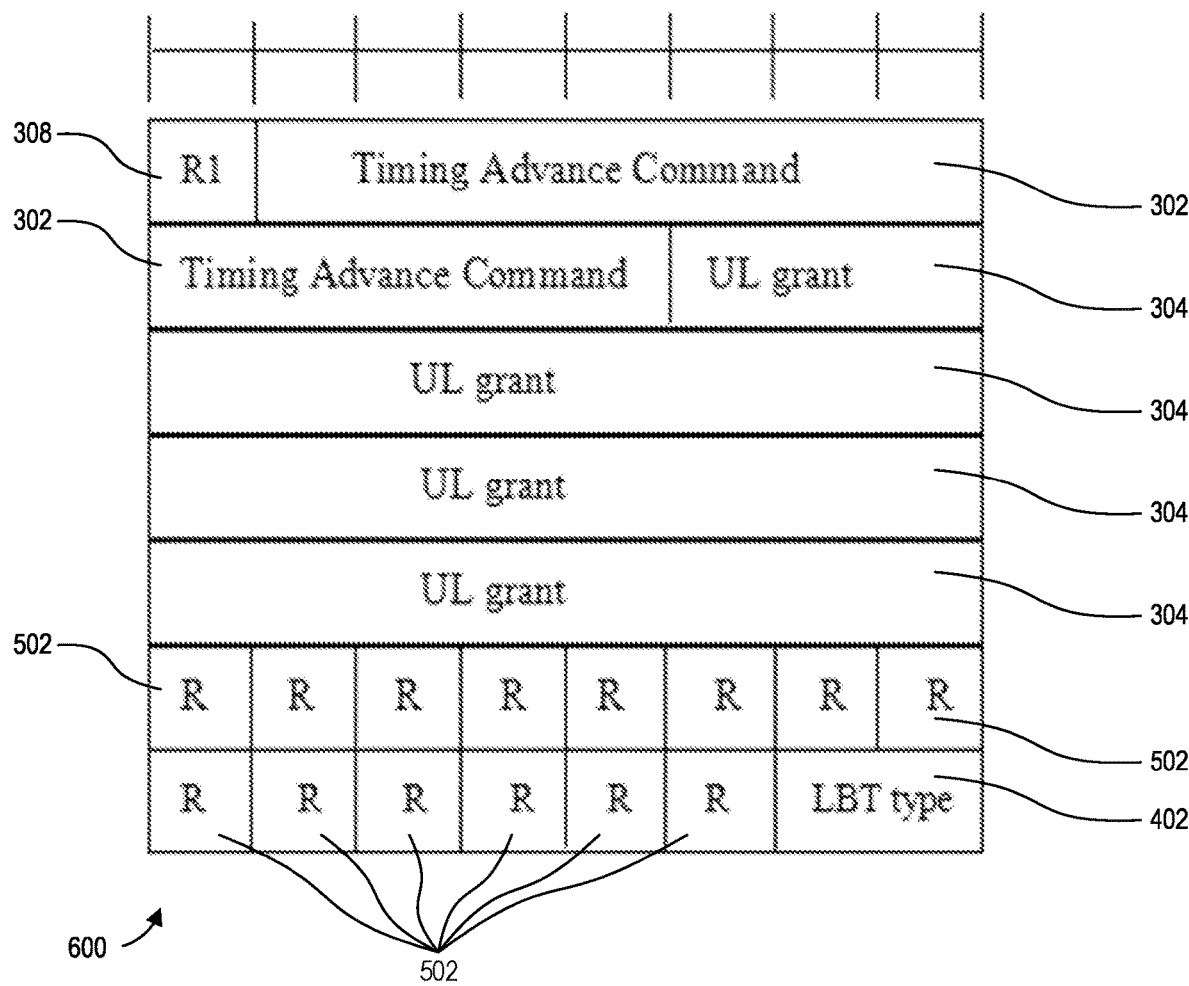
FIG. 6 shows another example RAR message format in accordance with various embodiments.

FIGS. 5 and 6 show additional example RAR message formats 500 and 600, respectively, according to the present embodiment. The example RAR message formats 500 and 600 each include the reserved block of bits for the Timing Advance Command 302, the reserved block of bits for the UL Grant 304, and the additional reserved bit (R) 308, each of which are illustrated as unchanged in comparison to the RAR message format 300 of FIG. 3. Additionally, the transmission bit locations within what previously was the reserved block of bits for C-RNTI 306 (see FIG. 3) are again repurposed to provide the indication of the LBT mode or type 402. FIG. 5 shows the indication of the LBT mode or type 402 placed at the transmission bit location(s) at the beginning of what was previously the reserved block of bits for the C-RNTI 306. Similarly, FIG. 6 shows the indication of the LBT mode or type 402 placed at the transmission bit location(s) at the end of what was previously the reserved block of bits for the C-RNTI 306. Other locations within what was previously the reserved block of bits for the C-RNTI 306 are possible for the indication of the LBT mode or type 402. The remainder of the transmission bit locations that comprise the remainder of the block of bits that are usually reserved for the C-RNTI 306 are altered to be reserved (shown as "R" reserved bits 502) for a different message purpose and/or to be blank or null.

As with the embodiment above (FIG. 4), because the size of the RAR message is the same as between an unlicensed cell and a licensed cell, and there is no problem when the RAR message for a licensed cell and the RAR message for an unlicensed cell are multiplexed. Accordingly, LBT mode selection can be achieved in a CA configuration where different cells operate in licensed and unlicensed spectrums. Additionally, the other additional reserved bits 502 can be utilized for other purposes, thereby increasing communication efficiency.

In alternative approaches, other bit fields within the RAR message can be repurposed for the indication of the LBT mode or type 402. For example, one or more bits from the reserved block of bits for Timing Advance Command 302, the reserved block of bits for UL Grant 304, and/or the reserved bit (R) 308 can be used instead of or in addition to one or more bits from the reserved block of bits for Temporary Cell Radio Network Temporary Identifier (C-RNTI) 306. For example, the reserved bit (R) 308 can be used for the purpose of indicating the LBT mode or type. However, in situation where more than one bit is needed, the reserved bit (R) 308 on its own is not sufficient. Also, in certain situations, the UL Grant bit field 304 may potentially include redundant bits, and one or more of the bits in the UL Grant field 304 may be used to indicate the LBT mode or type either on their own or in combination with other fields such as the reserved bit (R) 308. Further, different bits can be used from multiple of these different reserved fields to implement the indication of the LBT mode or type 402.

In accordance with these alternative approaches, the methods discussed above may also include the wireless access node 104 transmitting to the mobile station 102 the second message (e.g., RAR message) within the second message, at least one bit representing, at least in part, the LBT mode on at least one transmission bit location within the second message that is reserved for the UL Grant 304, or on at least a first one transmission bit location within the second message (e.g., the reserved bit (R) 308). In another example, the methods discussed above may also include the wireless access node 104 transmitting to the mobile station 102 the second message (e.g., RAR message) within the second message, at least two bits representing, at least in part, the LBT mode on at least two transmission bit locations within the second message (RAR message) selected from at least two of the following: a first one transmission bit location within the second message (e.g., the reserved bit (R) 308), a transmission bit location within the second message that is reserved for the C-RNTI 306, or a transmission bit location within the second message that is reserved for UL Grant 304.

Figure 7:
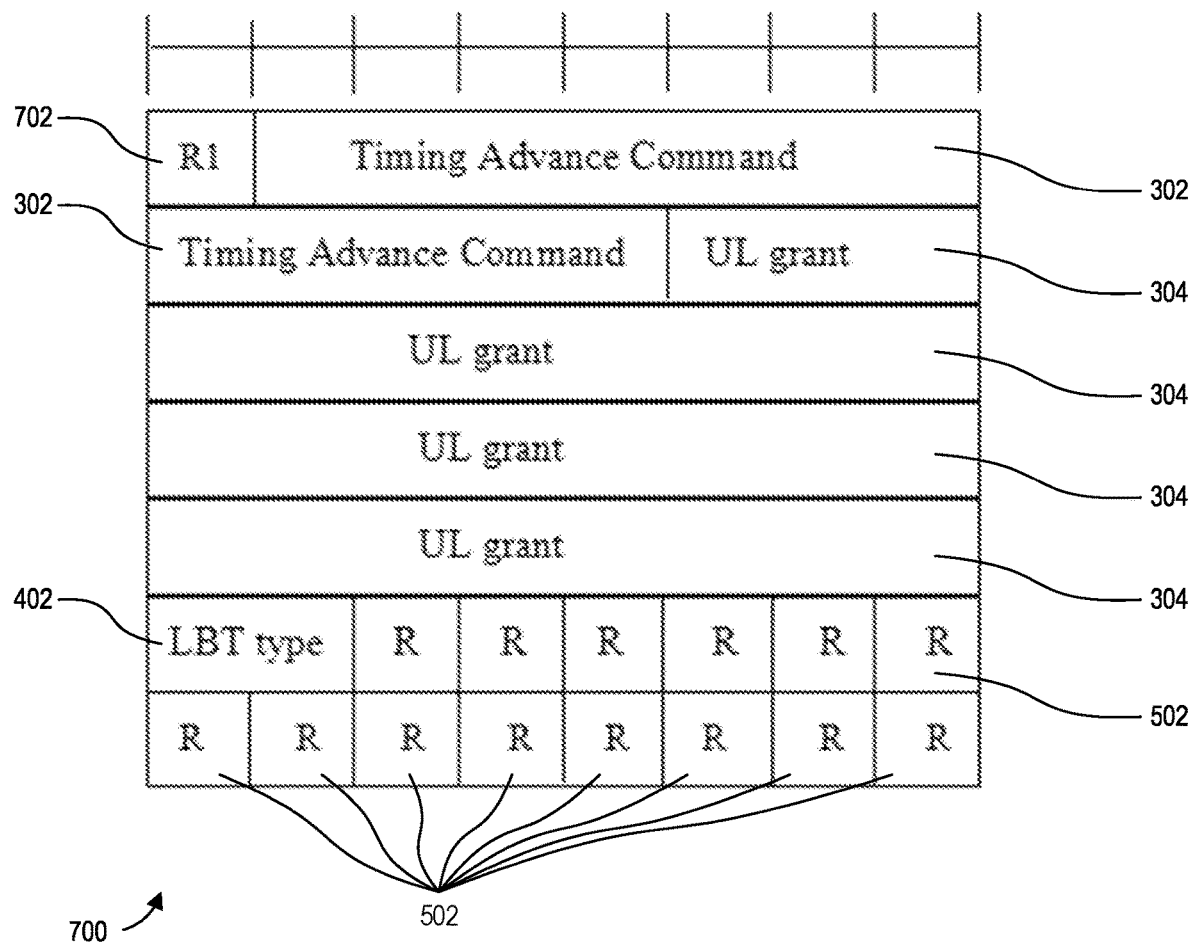
FIG. 7 shows another example RAR message format in accordance with various embodiments.
Figure 8:
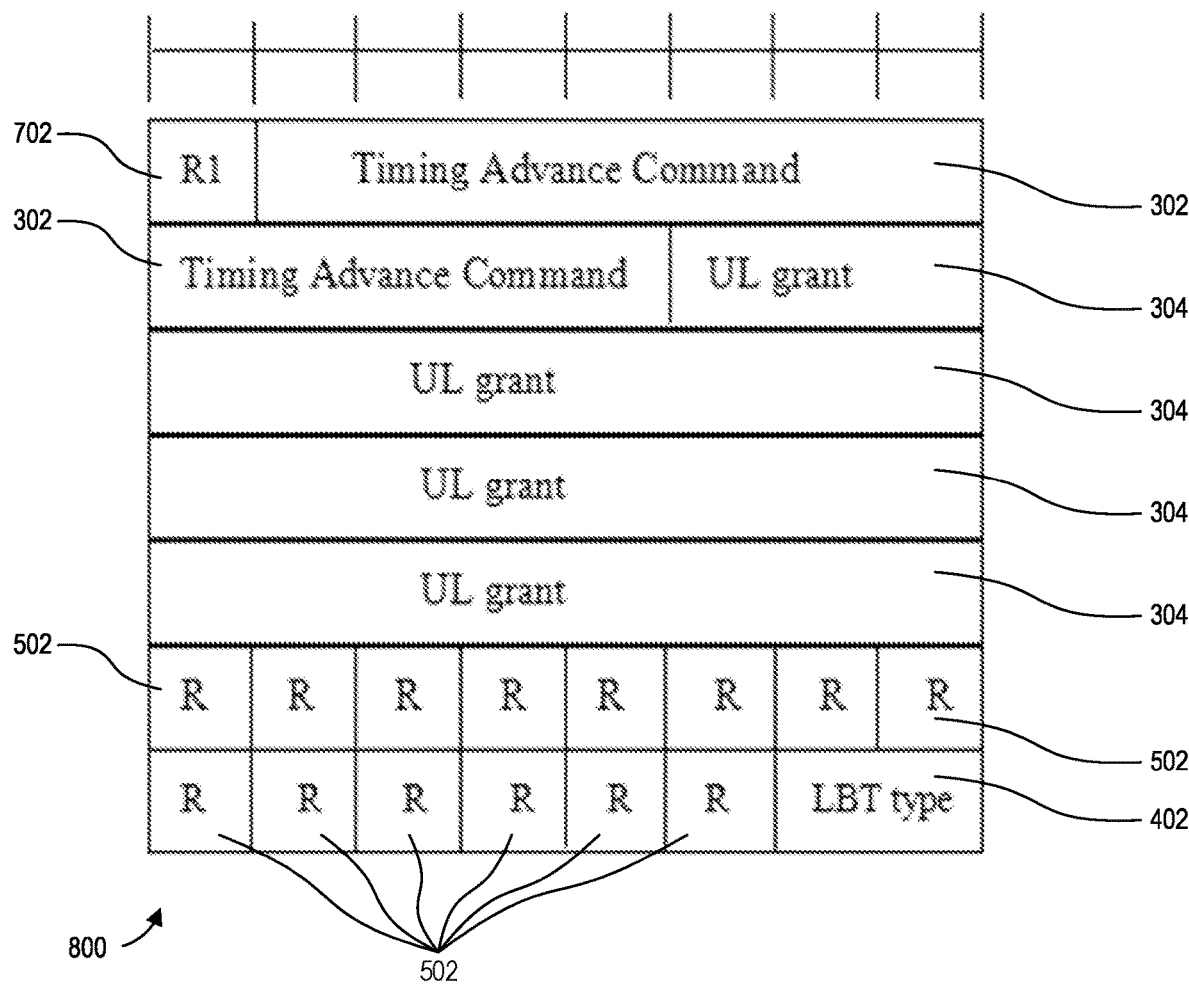
FIG. 8 shows another example RAR message format in accordance with various embodiments.

In accordance with another embodiment, FIGS. 7 and 8 show additional example RAR message formats 700 and 800, respectively. The example RAR message formats 700 and 800 each include the reserved block of bits for the Timing Advance Command 302 and the reserved block of bits for the UL Grant 304. Further, the example RAR message formats 700 and 800 each include the indication of the LBT mode or type 402 and the reserved "R" bits 502, as were shown in FIGS. 5 and 6, respectively. However, at a transmission bit location that was previously set as a reserved bit (R) 308 (see FIG. 3), a message type indication ("R1") 702 (e.g., a RAR message type indication) can be provided. In certain examples, this message type indication 702 can be provided at the first one (or more) transmission bit location within the second message. This message type indication 702 can provided an indication of whether the second message (RAR message) is of a format and/or size for a licensed cell or an unlicensed cell. For example, when R1 702 is set to 0, R1 may indicate that the RAR message is used for and/or has a format and/or size for a licensed cell. However, when R1 702 is set to 1, R1 702 may indicate that the RAR message is used for and/or has a format and/or size for an unlicensed cell. The opposite may be true, as well.

Alternatively, a bit from the sub-header of the RAR message can be repurposed to provide the RAR message type indication. However, this approach may affect backward compatibility.

As such, the methods discussed above may also include the wireless access node 104 transmitting to the mobile station 102 the second message (e.g., RAR message) comprising an indication that the second message applies to one of a cell of the mobile station operating in a licensed spectrum or a cell of the mobile station operating in an unlicensed spectrum. Similarly, the methods may also include the wireless access node 104 transmitting to the mobile station 102 the second message (e.g., RAR message) comprising an indication that the second message has a format size corresponding to a cell operating in a licensed spectrum or a cell operating in an unlicensed spectrum.

Regarding the second approach mentioned above, more specific embodiments involve handling RAR messages for the different cell types (i.e., unlicensed and licensed) separately so that they are not multiplexed together. As such, this second approach can be utilized whether or not the RAR message for the licensed and unlicensed cells have the same or different formats and/or sizes.

A first embodiment of the second approach involves the wireless access node 104 transmitting the RAR message via the same cell on which it received the preamble (msg1) from the mobile station 102. For example, if the preamble message (msg1) is transmitted on a first SCell that is an unlicensed cell, then the RAR message corresponding to that preamble message is transmitted on the same first SCell. By this, only RAR messages of the same size and/or format are multiplexed, thereby avoiding issues.

In accordance with this embodiment, various ones of the methods above may also include the wireless access node 104 receiving from the mobile station 102 the first message (e.g., RAR message) via a first cell operating in an unlicensed spectrum, and then transmitting the second message via the same first cell to the mobile station 102. This method may also include the wireless access node 104 multiplexing the first RAR message for the first cell with a second RAR message for a second cell, where the second cell can only have a same size RAR message as the first cell. In some examples, the first cell is a secondary cell (SCell) operating in the unlicensed spectrum, however the first cell can also be a primary cell (PCell) and/or can be operating in the licensed spectrum. These methods thus avoid multiplexing of RAR messages of different sizes and/or formats, which avoids backward compatibility issues.

A second embodiment of this second approach involves the wireless access node 104 handling the generation and transmission of RAR messages for unlicensed cells and licensed cells separately. The RAR message of a licensed cell is only transmitted in the same or another licensed cell, and a RAR message of an unlicensed cell is only transmitted in the same or another unlicensed cell. By this, only RAR messages of the same size and/or format are multiplexed, thereby avoiding issues. Additionally, in this embodiment, the RAR message of an unlicensed cell is not required to be transmitted only on the same unlicensed cell on which the preamble message is transmitted.

In accordance with this second embodiment, various ones of the methods above may also include the wireless access node 104 receiving from the mobile station 102 the first message (e.g., preamble or msg1) via a first cell operating in the unlicensed spectrum. The wireless access node 104 multiplexes the RAR message for the first cell with a second RAR message for a second cell having only a same RAR message format as the first cell. Alternatively, the second cell only comprises a cell that operates in the unlicensed spectrum. By this, only RAR messages having the same format, having the same size, and/or being for cells operating in the unlicensed spectrum can be multiplexed together.

Alternatively still, the RAR message comprises a first RAR message for a first cell that is multiplexed with a second RAR message for a second cell, wherein the first cell and the second cell operate in a same one of an unlicensed spectrum or a licensed spectrum. By this, RAR messages for cells operating in the licensed spectrum can only be multiplexed together with other RAR messages for other cells operating in the licensed spectrum. Similarly, RAR messages for cells operating in the unlicensed spectrum can only be multiplexed together with other RAR messages for other cells operating in the unlicensed spectrum. Accordingly, the handling and generation of the RAR messages is handled separately between the licensed and unlicensed spectrums.

In accordance with this embodiment, the methods may further include the wireless access node 104 transmitting to the mobile station the second message (RAR message) via the second cell operating in the unlicensed spectrum. Similarly, the methods may further include the wireless access node 104 transmitting to the mobile station the second message (RAR message) via a third cell operating in the unlicensed spectrum. By this, it is clear that RAR message of an unlicensed cell is not required to be transmitted only on the same unlicensed cell on which the preamble message is transmitted.

In various embodiments, as illustrated in FIG. 1, the mobile station 102 includes a processor 110 and a memory 112, wherein the processor 110 is configured to read computer code from the memory 112 to implement any of the methods and embodiments disclosed above relating to operations of the mobile station 102. Similarly, the wireless access node 104 includes a processor 120 and a memory 122, wherein the processor 120 is configured to read computer code from the memory 122 to implement any of the methods and embodiments disclosed above relating to operations of the wireless access node 104. Also, in various embodiments, a computer program product includes a non-transitory computer-readable program medium (e.g., memory 112 or 122) with computer code stored thereupon. The computer code, when executed by a processor (e.g., processor 110 or 120), causes the processor to implement a method corresponding to any of the embodiments disclosed above.

In accordance with the various methods and embodiments disclosed above, various technical advantages are realized. For example, the wireless access node 104 is able to specify an LBT mode or type that is to be used, which can allow for more efficient use of the wireless resources. Further, backward compatibility issues are addressed, particularly in CA configurations where cells operating in different licensed and unlicensed spectrums coexist.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method of communicating between a wireless access node and a mobile station, the method comprising:
   receiving, by the wireless access node from the mobile station, a first message; and
   in response to receiving the first message, transmitting, by the wireless access node to the mobile station, a second message comprising an indication of a listen-before-talk (LBT) mode for the mobile station,
   wherein at least one bit within the second message represents, at least in part, the LBT mode, the at least one bit is located within a block of bits that is reserved for a cell radio network temporary identifier (C-RNTI), and the at least one bit is located on at least one transmission bit location each being at a beginning of the block of bits or at an end of the block of bits.

2. The method of claim 1,
   wherein the at least one bit comprises two or more bits, and the at least one transmission bit location comprises two or more transmission bit locations.

3. The method of claim 1, wherein a remainder of the block of bits within the second message that is reserved for the C-RNTI is repurposed for a different message purpose.

4. The method of claim 1, wherein the second message further comprises
   at least another bit representing, at least in part, the LBT mode
   wherein the at least another bit is located within another block of bits that is reserved for an uplink (UL) grant or at the first bit of the second message.

5. A method of communicating between a wireless access node and a mobile station, the method comprising:
   receiving, by the wireless access node from the mobile station, a first message; and
   in response to receiving the first message, transmitting, by the wireless access node to the mobile station, a second message comprising an indication of a listen-before-talk (LBT) mode for the mobile station,
   wherein at least two bits within the second message represent, at least in part, the LBT mode, the at least two bits are located at two transmission bit locations that is reserved for a cell radio network temporary identifier (C-RNTI) or an uplink (UL) grant.

6. The method of claim 1 further comprising:
   transmitting, by the wireless access node to the mobile station, the second message comprising at least one of:
   a second indication that the second message applies to one of a cell of the mobile station operating in a licensed spectrum or a cell of the mobile station operating in an unlicensed spectrum; or
   a second indication that the second message has a format size corresponding to a cell operating in a licensed spectrum or a cell operating in an unlicensed spectrum.

7. The method of claim 1 further comprising:
receiving, by the wireless access node from the mobile station, the first message via a first cell operating in an unlicensed spectrum; and
transmitting, by the wireless access node to the mobile station, the second message via the first cell.

8. The method of claim 7, wherein the first cell is a secondary cell (SCell) operating in the unlicensed spectrum.

9. The method of claim 1 further comprising:
receiving, by the wireless access node from the mobile station, the first message via a first cell operating in an unlicensed spectrum,
wherein the second message comprises a random access response (RAR) message, and wherein the RAR message for the first cell is multiplexed with a second RAR message for a second cell, wherein the second cell has only a same RAR message format as the first cell or the second cell only comprises a cell that operates in the unlicensed spectrum.

10. The method of claim 1,
wherein the second message comprises a random access response (RAR) message, and wherein the RAR message comprises a first RAR message for a first cell that is multiplexed with a second RAR message for a second cell, wherein the first cell and the second cell operate in a same one of an unlicensed spectrum or a licensed spectrum.

11. The method of claim 9, further comprising:
transmitting, by the wireless access node to the mobile station, the second message via the second cell operating in the unlicensed spectrum or via a third cell operating in the unlicensed spectrum.

12. The method of claim 1, further comprising:
determining, by the wireless access node, an LBT mode for the mobile station prior to transmitting the second message.

13. The method of claim 1, wherein the mobile station operates in a carrier aggregation (CA) configuration.

14. The method of claim 1, wherein the mobile station utilizes at least two cells, wherein a first cell of the mobile station operates in a licensed spectrum and a second cell of the mobile station operates in an unlicensed spectrum.

15. The method of claim 1, wherein the LBT mode is selected from a plurality of LBT modes.

16. The method of claim 1, wherein the indication of the LBT mode comprises a two-bit message indicating the LBT mode.

17. A method of wireless communication performed by a mobile station comprising:
transmitting to a wireless access node, a first message;
after transmitting the first message, receiving from the wireless access node, a second message comprising an indication of a listen-before-talk (LBT) mode for the mobile station; and
performing an LBT procedure dictated by the indication of the LBT mode in the second message prior to transmitting a third message to the wireless access node,
wherein at least one bit within the second message represents, at least in part, the LBT mode, the at least one bit is located within a block of bits that are reserved for a cell radio network temporary identifier (C-RNTI), and the at least one bit is located on at least one transmission bit location at a beginning of the block of bits or at an end of the block of bits.

18. A wireless access node comprising a processor and a memory, wherein the processor is configured to read computer code from the memory to perform steps comprising:
receiving, from a mobile station, a first message; and
in response to receiving the first message, transmitting, to the mobile station, a second message comprising an indication of a listen-before-talk (LBT) mode for the mobile station,
wherein at least one bit within the second message represents, at least in part, the LBT mode, the at least one bit is located within a block of bits that are reserved for a cell radio network temporary identifier (C-RNTI), and the at least one bit is located on at least one transmission bit location at a beginning of the block of bits or at an end of the block of bits.

* * * * *